(12) United States Patent
Cahen et al.

(10) Patent No.: US 9,943,187 B2
(45) Date of Patent: Apr. 17, 2018

(54) BEVERAGE MACHINE WITH VIBRATION INHIBITOR

(71) Applicant: NESTEC S.A., Vevey (CH)

(72) Inventors: Antoine Cahen, Lausanne (CH); Blaise Rithener, La Tour-de-Peilz (CH); Francois Besson, Colombier (CH)

(73) Assignee: Nestec S.A., Vevey (CH)

( * ) Notice: Subject to any disclaimer, the term of this patent is extended or adjusted under 35 U.S.C. 154(b) by 549 days.

(21) Appl. No.: 14/406,967

(22) PCT Filed: Jun. 14, 2013

(86) PCT No.: PCT/EP2013/062334
§ 371 (c)(1),
(2) Date: Dec. 10, 2014

(87) PCT Pub. No.: WO2013/186339
PCT Pub. Date: Dec. 19, 2013

(65) Prior Publication Data
US 2015/0164266 A1    Jun. 18, 2015

(30) Foreign Application Priority Data
Jun. 15, 2012 (EP) .................... 12172098

(51) Int. Cl.
*A47J 31/00* (2006.01)
*A47J 31/44* (2006.01)
(52) U.S. Cl.
CPC ....... *A47J 31/4403* (2013.01); *A47J 31/4425* (2013.01); *A47J 31/4428* (2013.01)

(58) Field of Classification Search
CPC . A47J 31/4428; A47J 31/4425; A47J 31/4482
USPC .............. 99/284, 290, 307, 295; 222/108
See application file for complete search history.

(56) References Cited

U.S. PATENT DOCUMENTS

| 5,473,972 A | * | 12/1995 | Rizzuto | A47J 31/4485 |
|---|---|---|---|---|
| | | | | 99/290 |
| 5,827,428 A | * | 10/1998 | Chang | B01D 61/10 |
| | | | | 210/248 |
| 6,619,507 B2 | * | 9/2003 | Lassota | B67D 1/06 |
| | | | | 222/108 |

(Continued)

FOREIGN PATENT DOCUMENTS

| DE | 202004020915 | 4/2006 |
|---|---|---|
| WO | 2011083103 | 7/2011 |

OTHER PUBLICATIONS

WO 2011/012489 (Ozanne) Mar. 2011 A47J 4482.*

*Primary Examiner* — Reginald L Alexander
(74) *Attorney, Agent, or Firm* — K&L Gates LLP (57) ABSTRACT

A beverage preparation machine (1) has: a beverage preparation module (2) comprising a module interface (21', 25, 26) and an auxiliary device (10) comprising a device interface (15, 16). The module and device interfaces being arranged for assembling the module (2) and the device (10) together. At least one of the module and device interfaces (15, 16, 21', 25, 26) comprises one or more dampening members (21') so arranged that the module (2) and the device (10) are in direct contact only via the dampening member(s) (21') when the module (2) and device (10) are assembled together via the interfaces (15, 16, 21', 25, 26).

17 Claims, 2 Drawing Sheets

(56) References Cited

U.S. PATENT DOCUMENTS

| | | | | |
|---|---|---|---|---|
| 8,172,111 B1 * | 5/2012 | Fowler | ................ | B67C 11/02 |
| | | | | 137/313 |
| 8,757,050 B2 * | 6/2014 | Schallig | ............... | A47J 31/54 |
| | | | | 126/271.1 |
| 8,931,397 B2 * | 1/2015 | Frigeri | ............. | A47J 31/4482 |
| | | | | 99/284 |
| 9,016,509 B2 * | 4/2015 | Santy | .................... | B65D 1/34 |
| | | | | 137/313 |
| 2007/0298953 A1 | 12/2007 | Gavillet et al. | | |

* cited by examiner

BEVERAGE MACHINE WITH VIBRATION INHIBITOR

CROSS REFERENCE TO RELATED APPLICATIONS

The present application is a National Stage of International Application No. PCT/EP2013/062334, filed on Jun. 14, 2013, which claims priority to European Patent Application No. 12172098.1, filed Jun. 15, 2012, the entire contents of which are being incorporated herein by reference.

FIELD OF THE INVENTION

The field of the invention pertains to beverage dispensing machines subjected to small movements during use, e.g. vibrating, and having an arrangement for reducing the nuisances resulting therefrom.

BACKGROUND ART

Certain beverage preparation machines use capsules containing ingredients to be extracted or to be dissolved; for other machines, the ingredients are stored and dosed automatically in the machine or else are added at the time of preparation of the drink.

Most beverage machines possess within a housing: filling means that include a pump for liquid, usually water, which pumps the liquid from a source of water that is cold or indeed heated through heating means, such as a heating resistor, a thermoblock or the like, a brewing unit in which an ingredient is brewed with water or a mixing unit in which ingredients are mixed together, and a beverage outlet for dispensing the prepared beverage. Examples of fluid circuits are disclosed in U.S. Pat. Nos. 2,715,868, 5,392,694, 5,943,472, 5,992,298, 6,554,588, WO 2006/032599, WO 2009/024500, WO 2009/150030 and WO 2010/006953.

Usually, the beverage outlet is located above a grid for supporting a cup or other recipient under the outlet and for the passage of possible drips from the beverage outlet or other spills into a collector tray located under the grid. Examples of such machines are disclosed in EP 0 549 887, EP 1 440 639, EP 1 731 065, EP 1 867 260, U.S. Pat. No. 5,161,455, U.S. Pat. No. 5,353,692, WO 2009/074557, WO 2009/074559, WO 2009/135869, WO 2011/154492 and WO 2012/007313.

Typically, beverage machines include vibrating devices such as pumps that tend to generate and propagate vibrations through the machines during use. Depending on the construction of the machine and its natural or resonant frequencies the noise and discomfort created by such vibration during use may be quite significant. It may be possible to adjust the overall natural or resonant frequencies of the machine, e.g. by adjusting the mass and/or structure of the machine. However, such an approach is rendered more difficult when the same vibrating devices can operate at different frequencies, e.g. a solenoid pump powered by a 50 or 60 Hz power supply 240 or 110 Volts depending on the place of use, or when the machine carries a variable mass, e.g. when the machine can carry different types of cups or mugs for filling thereof or when the machine is fitted with one or more reservoirs for fresh and/or waste ingredients that may be more or less filled during use. In such a case it is more difficult to prevent—over the entire possible range of use of the machine—the echoing of vibrations that are in line or close to the overall natural or resonant frequencies of the system, which may even result in vibration amplifications.

To reduce the nuisance caused by small movements of a beverage machine during use, in particular by vibrating parts of the beverage machine, typically pumps e.g. piston pumps, it is known to use dampening arrangements, e.g. by dampening the pump itself in the machine or by dampening the vibrations carried by the liquid pumped by the pump. Typically, a vibrating pump can be mounted in a beverage machine with specific vibration-dampening connectors, e.g. spring elements, as for instance disclosed in WO 2006/032599, WO 2009/150030 and WO 2010/108700. When a vibrating pump is used that transfers vibrations along the fluid line, the fluid circuit may include an arrangement for dampening the circulating liquid in the fluid line, e.g. such a fluid line may include elastic sealing connectors or membranes, as for instance disclosed in WO 2009/130099, WO 2010/006953, WO 2011/083103 and WO 2011/107574.

Despite the abovementioned efforts, there is still a need to reduce the nuisance and noise generated by small movements of beverage preparation machines during use, in particular due to vibrating parts of the machines.

SUMMARY OF THE INVENTION

The invention thus relates to machines for dispensing a beverage from a beverage outlet to cups, for instance to cups of different sizes, in particular to short cups, e.g. espresso cups, and tall cups such as mugs, e.g. cappuccino cups. The machine may be configured to prepare beverages from capsules.

For the purpose of the present description, a "beverage" is meant to include any human-consumable liquid substance, such as tea, coffee, hot or cold chocolate, milk, soup, baby food, etc. . . . . A "capsule" is meant to include any pre-portioned beverage ingredient, such as a flavouring ingredient, within an enclosing packaging of any material, in particular an airtight packaging, e.g. plastic, aluminium, recyclable and/or biodegradable packagings, and of any shape and structure, including soft pods or rigid cartridges containing the ingredient.

The beverage preparation machine can be an in-home or out of home machine. The machine may be a coffee, tea, chocolate, cacao, milk, soup, baby food, etc. . . . preparation machine. The machine may be arranged for preparing within a beverage processing module a beverage by passing hot or cold water or another liquid through a capsule containing an ingredient, such as a flavouring ingredient, of the beverage to be prepared, such as ground coffee or tea or chocolate or cacao or milk powder.

The beverage preparation typically includes the mixing of a plurality of beverage ingredients, e.g. water and milk powder, and/or the infusion of a beverage ingredient, such as an infusion of ground coffee or tea with water. One or more of such ingredients may be supplied in loose and/or agglomerate powder form and/or in liquid form, in particular in a concentrate form. A carrier or diluents liquid, e.g. water, may be mixed with such ingredient to form the beverage.

For instance, a predetermined amount of beverage is formed and dispensed on user-request, which corresponds to a serving. The volume of such a serving may be in the range of 25 to 200 ml or up to 300 or 400 ml, e.g. the volume for filling a cup or mug, depending on the type of beverage. Formed and dispensed beverages may be selected from ristrettos, espressos, lungos, cappuccinos, café latte, americano coffees, teas, etc. . . . . In particular, a coffee machine may be configured for dispensing espressos, e.g. an adjustable volume of 20 to 60 ml per serving, and/or for dispensing lungos, e.g. a volume in the range of 70 to 150 ml per serving.

According to a particular aspect, the invention relates to a beverage preparation machine having: a beverage preparation module comprising at least one module interface; and an auxiliary device comprising at least one device interface. The module and device interfaces are arranged for assembling the module and the device together.

Typically, the beverage preparation module is subjected to small movements during use, for instance resulting from a vibrating part such as a pump e.g. a reciprocating pump in particular a piston pump.

The beverage preparation module may include a beverage processing unit, e.g. for handling beverage ingredients, in particular for mixing beverage ingredients and/or thermal conditioning of the beverage.

The auxiliary device, may be a passive or active device, that may be used to increase or complete the functionalities of the beverage module, for instance, the auxiliary device may be a cup support device such as a cup heightening device, a service device, a reservoir for storing fresh or used ingredients or waste material, a milk frothing device or other similar apparatus.

In accordance with the invention at least one of these module and device interfaces comprises one or more dampening members so arranged that the module and the auxiliary device are in direct mechanical contact only via the dampening member(s) when the module and device are assembled together via the interfaces.

Hence, when the module is subjected to vibrations or other mechanical movements, e.g. for instance to vibrations of pump that is mounted in the module, the propagation of such vibrations to the auxiliary device assembled and secured to the module may be inhibited by the dampening member(s). It follows that a participation of the auxiliary device in the nuisance generation, typically noise, can be reduced or suppressed.

Generally speaking, for the dampening effect to be obtained, the dampening member should have a rigidity that is lower than the rigidity of the module at the module-device interfaces. In particular, the dampening member, should be sufficiently deformable that transmission of vibrations or mechanical shocks are inhibited or reduced along the dampening member whereby the auxiliary device is not or less exposed to vibrations or mechanical shocks than the module. In particular, the dampening member should be able to deform for dampening, elastically and/or plastically, to absorb movements originating from the module and inhibiting the transfer of such movement (e.g. vibrations) to the auxiliary device. For instance, vibrations from the module may be absorbed by the dampening member and transformed into thermal radiation rather than transferred to the auxiliary device as mechanical energy.

Typically, one or more dampening members are made of a material that have a rubber-type or elastomeric elasticity, such as silicone or rubber. The dampening members may have an ability for elastic and/or plastic deformation under the effect of small movements, e.g. vibrations, of the module.

In one embodiment, the module and the device interfaces are mechanically fixed together upon assembly, optionally at least one of said interfaces is removable. In this context, the concept of "fixing" means that the relevant parts are permanently assembled from a user's perspective. The parts may be disassembled, destructively or non-destructively, by specially trained service or repair persons. However, the normal user is not expected to disassemble such an interfaces, whether for preparing a beverage or for other type of handling by the user, e.g. cleaning or storing the machine.

In another embodiment, the module and device interfaces are disassemblable upon assembly. In this case, the device interfaces are configured so that a normal user can or is even expected to disassemble the interfaces for normal use, e.g. for a beverage preparation or another type of handling by the user of the machine, e.g. normal servicing.

The auxiliary device may be assemblable to the module by an operative module interface in an operative position. The device may be assemblable to the module by a rest module interface in a rest position, the rest position being different to an operative position of the device. In the latter case, in its operative position, the device may be assembled or not assembled to the module.

At least one of the dampening members can form a flexure bearing for allowing motion of the device relative to the module. The dampening member can be fixed to at least one of a device interface and a module interface, for instance to both. In this case the interfaces are secured together by the dampening member itself.

The device interface and the module interface may be magnetically constrained together when the device is assembled to the module. In such a case, the interfaces may also be secured together by another means such as by the dampening member.

The device interface can comprise at least one magnetic field-generating element, such as a magnet element e.g. a permanent magnet or electromagnet, that is/are arranged to be magnetically constrained against (a) corresponding ferromagnetic element(s) of the module interface or vice versa. In particular, the magnetic or ferromagnetic element of the device may have an average magnetic field axis that is off-set above an average magnetic field axis of the magnetic or ferromagnetic element of the module so that the device is urged downwards by the module.

A suitable magnetic-field generating element may be a permanent magnet, e.g. made of iron, nickel, cobalt, rare earth metals, e.g. lanthanide, and alloys and oxides containing such metals as well as polymers (e.g. plastics) carrying such elements and components. It is also possible to use an electromagnet as a magnet element.

A suitable ferromagnetic element may be made of at least one of Co, Fe, $Fe_2O_3$, $FeOFe_2O_3$, $NiOFe_2O_3$, $CuOFe_2O_3$, MgO $Fe_2O_3$, $Nd_2Fe_{14}B$, Mn, Bi, Ni, MnSb, $MnOFe_2O_3$, $Y_3Fe_5O_{12}$, $CrO_2$, MnAs, Gd, Dy, EuO, $Cu_2MnAl$, $Cu_2MnIn$, $Cu_2MnSn$, $Ni_2MnAl$, $Ni_2MnIn$, $Ni_2MnSn$, $Ni_2MnSb$, $Ni_2MnGa$, $Co_2MnAl$, $Co_2MnSi$, $Co_2MnGa$, $Co_2MnGe$, $SmCo_5$, $Sm_2Co_{17}$, $Pd_2MnAl$, $Pd_2MnIn$, $Pd_2MnSn$, $Pd_2MnSb$, $Co_2FeSi$, $Fe_3Si$, $Fe_2VAl$, $Mn_2VGa$ and $Co_2FeGe$.

The magnet and/or the ferromagnetic element of the device and/or module interface can be mounted in a hole, such as a through-hole or a blind hole, optionally force-fitted or glued or screwed in such a hole, of a non-ferromagnetic element such as a non-ferromagnetic or magnetically indifferent wall or support element. Other assembly and connection methods are of course possible.

One or more dampening members may be arranged about a magnetic field generating element and/or a ferromagnetic element(s). For example, at least one dampening member forms a loop such as a ring about such a magnetic and/or ferromagnetic element or a plurality of dampening members are in a spaced apart configuration about such an element.

In an embodiment, the auxiliary device has a bottom arranged to rest on a foot of the module, the device bottom forming a device interface spaced by at least one of the dampening members over a module interface formed by the foot, the auxiliary device and the module are in particular constrained together magnetically and/or by gravity. For example, the device interface comprises a magnetic field generating element and the module interface comprises a ferromagnetic element or vice versa, the magnetic field generating element and the ferromagnetic elements cooperating together to secure the device and module together.

In another embodiment, the module and the auxiliary device may be arranged to rest directly on a common external support surface and to be supported thereby during use.

Such an external support surface for the bottoms can be a kitchen or dining table or any generally stable and horizontal surface that is able to support the weight of the beverage preparation machine.

For instance, the auxiliary device comprises an upright wall in or on which the device interface is mounted and the module comprises a first face in or on which the module interface is located, the wall and the first face facing each other when the module and device are assembled together via the interfaces. For instance, the device interface comprises a magnetic or ferromagnetic element and the module interface comprises a corresponding magnetic or ferromagnetic element so that when the device element and the module element are magnetically constrained together:
  the device element, in particular an apparent face thereof, is recessed in an recess of the upright wall and the module element, in particular an apparent face thereof, protrudes away from the first face such that the module element, in particular the apparent element face, extends into the device recess, in particular to or towards the apparent face of the device element; or
  the device element, in particular an apparent face thereof, protrudes away from the upright wall and the module element, in particular an apparent face thereof, is recessed in a recess of the first face such that the device element, in particular the apparent element face, extends into the face's recess, in particular to or towards the apparent face of the module element.

The module may have, in addition to the above module interface, a further module interface spaced apart therefrom. The further module interface can be located in or on a second module face different from the first face, the device wall and the second module face facing each other when the module and auxiliary device are assembled together via the device interfaces and the further module interface.

In a preferred embodiment, the auxiliary device is a cup-support device for supporting a cup under a beverage outlet of the beverage preparation module.

Separating the cup-support device from the module by the dampening member reduces vibration propagation from the module to the cup support and vibration-caused displacements of the cup placed on the support during beverage dispensing to the cup. Hence, preventing a substantial displacement of the cup during dispensing reduces the risk that the beverage is dispensed from the outlet over the mouth of the cup and outside the cup or, even worse, that the cup gets off the support or hits against the beverage module and vibrates thereagainst.

The cup support may have a bottom for resting on an external support surface or on a foot of the beverage preparation module. The cup support can have a platform that is supported by the bottom and that is configured for receiving a cup and supporting thereof above the support bottom, the platform being in particular spaced over the bottom by a generally upright wall such as an upright wall forming with the bottom a receptacle having a cavity for collecting liquid.

Typically, the platform comprise an arrangement for draining liquid through the platform, in particular a grid-like arrangement.

The module may have a service device bearing a module interface, in particular a service device for supplying a consumable substance and/or for collecting a used or waste substance.

Typically, the service device is configured for collecting at least one of: one or more waste beverage ingredients, such as a used flavouring ingredient and/or waste water; one or more used capsules for supplying a beverage ingredient into beverage preparation module; and a cleaning agent, such as a cleaning, rinsing or descaling liquid. A suitable service device may be configured for storing a supply of the abovementioned beverage ingredients and/or capsules before use or a supply of the abovementioned cleaning agent before use.

For instance, the service device comprises at least one of: a drawer configuration for being slidable into and out of the module; a handle for manually moving the service device in an out of the module; and a first receptacle for containing a first substance and a second receptacle for containing a second substance, such as a lower receptacle and an upper receptacle, in particular a lower receptacle for containing liquid and an upper receptacle for containing a solid.

The service device may include a handle that forms at the same time the module interface or part thereof or a support for the module interface.

When the service device is movable, in particular slidable in and out of the module, it can be secured in the beverage preparation module to resist a disassembly of the interface of the beverage preparation module and the auxiliary device interface.

For example, the service device may be secured in the module's cavity by a snap or a magnetic connector or another assembling means that is stronger than the connection force of the assembled interfaces of the auxiliary device and corresponding interface of the module. Hence, when the interfaces of the module, i.e. part of the service device, and of the auxiliary device are separated, the service device stays in place in the cavity of the module.

The auxiliary device can be a heightening device for heightening a short cup under the outlet upon assembly to the module, the module being arranged to dispense beverage from the beverage outlet into a tall cup placed under the outlet upon removal of the heightening device from under the outlet of the module.

The placement surface for such a tall cup under the beverage outlet can be a surface external to the machine, e.g. the surface of a table on which the beverage preparation module is placed. Alternatively, the beverage preparation module may include under its beverage outlet a foot on which a tall cup or the heightening device can be placed.

Optionally, the interfaces of the heightening device and of the module are disassemblable for separating the device from the module and removing the device from under the outlet to permit the placement of the tall cup on the support surface or foot under the outlet. Alternatively, the device may simply be moved away from the outlet without disassembly of the interfaces.

In the context of the present disclosure, the relative orientation of the machine, e.g. references to the machine's top, front, bottom, side, rear, etc., unless specified otherwise, typically relate to the orientation of operation of the machine, e.g. on top of a table, with the machine in front of a user for naturally operating the machine to dispense a beverage.

BRIEF DESCRIPTION OF THE DRAWINGS

The invention will now be described with reference to the drawings, in which.

DETAILED DESCRIPTION

FIGS. 1 to 3B illustrate particular embodiments of the present invention, in particular an embodiment of an auxiliary device 10, for example in the form of a cup-support device or cup-heightening device, and an embodiment of a beverage preparation machine 1 formed of a beverage preparation module 2 and device 10.

Figures 1, 2, 3, 3A, 3B:
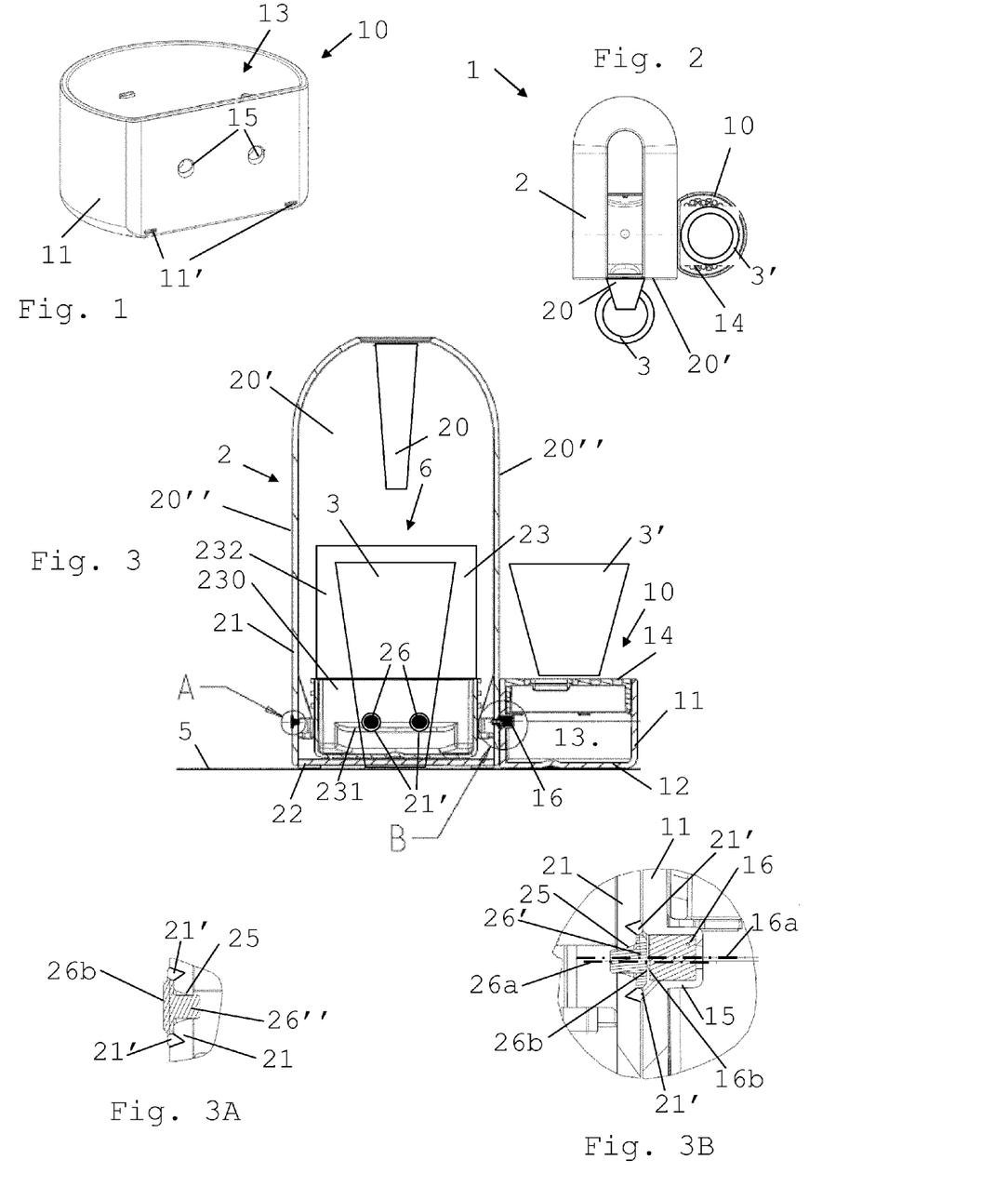
FIG. 1 is a perspective view of part of an auxiliary device of a beverage preparation module according to the invention.
FIGS. 2 and 3 are top and front views of the beverage preparation machine including the auxiliary device of FIG. 1, in which the auxiliary device and the module of the machine rest on the same external support surface.
FIGS. 3A and 3B are enlarged views of Details A and B indicated in FIG. 3.

Machine 1 can be electrically powered, typically by the mains, via an electric cord.

Beverage preparation module 2 typically includes an internal circuit for circulating liquid, e.g. water, from reservoir or tank (not shown). Further details on suitable tanks and reservoirs are for example disclosed in WO2007/135136, WO 2010/128109, WO 2011/083103, WO 2011/089210 and EP 2 228 633.

Alternatively, module 2 may be connected directly to the tap. Module 2 is covered by a housing 21 and has a bottom 22.

Module 2 can be arranged for holding a flavouring ingredient, in particular a pre-portioned ingredient such as an ingredient supplied to such module within a capsule, and circulating a liquid therethrough to form a beverage. Examples of such modules are disclosed in WO 2009/074550 and in WO 2009/130099, the teachings of which are hereby incorporated by way of reference.

The beverage, upon formation, can be dispensed via beverage outlet 20 to a dispensing area 6, e.g. typically located on or above a support 5 on which beverage preparation machine 1 is placed. During use, device 10 is typically located in dispensing area 6.

When device 10 is a cup heightening device, it can be arranged for heightening a short cup 3' under a beverage outlet 20 of a beverage preparation module 2 arranged to dispense beverage into a tall cup 3.

The placement surface for such a tall cup 3 and for heightening device 10 under beverage outlet 20 can be a surface 5 external to the machine, e.g. a portion of the surface of support 5 such as a table on which beverage preparation module 2 is placed. Alternatively, the beverage preparation module includes a foot extending under the beverage outlet on which either the tall cup or the heightening device can be placed.

Device 10, for instance a cup support device or a cup heightening device, comprises:
    a bottom 12 for resting on support surface 5, such as surface external to the machine or a surface of a foot of the module;
    a platform 14 that is supported by bottom 12 and that can be configured for receiving short cup 3' and heightening short cup 3' over the bottom 12, e.g. typically by 1 to 10 cm such as 2 to 7 cm; and
    an interface 15,16 for assembling and securing bottom 12 and platform 14 as a unit 12,14 to a corresponding interface 21',25,26 of module 2, e.g. under outlet 20.

Platform 14 can comprise an arrangement for draining liquid through platform 14, in particular a grid-like arrangement. For instance, platform 14 includes an arrangement of a plurality of through-holes. A larger through-hole, e.g. having a diameter in the range of 0.5 to 1.5 cm, may be provided vertically under outlet 20 when heightening device is in use thereunder, so as to avoid massive spills on platform 14 should a cup 3' be removed from platform before the end of a beverage dispensing cycle. In this case, beverage would flow directly through platform 14 via the larger through-hole without soiling the platform.

In accordance with the invention module and device interfaces 15,16,21',25,26 comprises one or more dampening members 21' so arranged that module 2 and device 10 are in direct contact only via the dampening member(s) 21' when module 2 and device 10 are assembled and secured together via the interfaces 15,16,21',25,26. For instance, one or more dampening members 21' can be made of a material having a rubber-type or an elastomeric elasticity, such as silicon or rubber, and/or a plastic deformability.

In this particular embodiment, interfaces 15,16;21'25,26 of device 10 and of module 2 are disassemblable for separating unit 12,14 from said module 2 and removing unit 12,14 from under beverage outlet 20 to allow placement of tall cup 3 under outlet 20.

Typically, device 10 has a generally upright wall 11 for spacing platform 14 over bottom 12. Sidewall 11 can be connected to bottom 12 and form therewith a receptacle having a cavity 13 for collecting liquid. For instance, sidewall 11 is assembled to or integral with bottom 12. The device interface 15,16 may be mounted to or comprised in or formed by upright wall 11.

In a particular embodiment, auxiliary device interface 15,16 may include:
    a magnet element 16 that is arranged to be magnetically constrained against a corresponding ferromagnetic element 26 of module interface 21',25,26; and/or
    a ferromagnetic element that is arranged to be magnetically constrained against a corresponding magnet of a module interface.

Magnet 16 and/or ferromagnetic element of device interface 15,16 can be mounted in a hole, such as a through-hole or a blind hole 15, of a non-ferromagnetic element such as a non-ferromagnetic wall 11, e.g. a plastic wall.

Likewise, element 26,26'26" may be mounted in a hole, such as a through-hole 25 or a blind hole, of a non-ferromagnetic element such as a non-ferromagnetic housing 21 or of a service device 23 as discussed below, e.g. made of plastic. Module 2 typically has a housing 21 provided with dampening elements 21' forming support bumps about elements 26,26'26" for a proper positioning of auxiliary device 10 thereagainst, as illustrated in FIGS. 3A and 3B.

In a particular embodiment of the invention, module comprises further module interfaces 25,26',26" for disassemblable assembly of interface 15,16 of auxiliary device 10. Such further module interface 25,26',26" can be so located that, when device interface 15,16 is assembled thereto, unit 12,14 of device 10 is located away from under beverage outlet 20. Hence, auxiliary device 10 may be secured against module 2 under outlet 20 in a use (or operative) position, and it can also be secured in a rest position against module 2 away from under outlet 20.

Auxiliary device 10 may have a single or a plurality of assembling interface units 15,16 that cooperate with a corresponding number of interface units 21',25,26 of module 2 for assembling the device to the module. As illustrated in FIG. 3, the module interface includes a pair of units 21',25, 26. This pair of units cooperates with a pair of units 15,16 as indicated in FIGS. 1 and 3. It is of course possible to use more or less dampening members 21' with units 15,16 and 25,26. In the present example, a dampening element 21' is provide for each unit 15,16. However, it is possible to have a pair of device units cooperating with a pair of module unit and only one dampening element or more than two dampening elements.

Beverage outlet 20 and module interface 21',25,26 can be located on a first face 20' of machine 2. The above further module interfaces 21',25,26',26" may be located on one more second faces 20" of the machine, in particular the first face may form a machine front face 20' and the second face(s) may form at least one of a machine side face 20" and a machine rear face.

Walls 11 may bear dampening members 11' that rest against faces 20',20" when auxiliary device 10 is placed thereagainst.

Dampening members 11',21' may be shaped as rings or as one or more pins or have another shape. Dampening members 11',21' can be secured in module faces 20',20" and/or in device wall 11 by gluing, squeezing, welding, force-fitting, screwing, etc. . . .

In FIGS. 2 and 3, auxiliary device 10, e.g. heightening device, is shown in its rest position against a side face 20" of module 2.

Furthermore, module 2 may have a cavity for receiving a service device 23 bearing at least one of module interface 21',25,26 and such further module interface 21',25,26',26", in particular a service device for supplying a consumable substance and/or for collecting a used or waste substance. In FIG. 3, module 2 is shown with a service device 23 bearing module interface 21',25,26 for assembling auxiliary device 10 under beverage outlet 20. Alternatively, it is also possible to position the service device adjacent a rest position of the auxiliary device 10.

Service device 23 may comprise at least one of:
a drawer configuration for being slidable into and out of module 2;
a handle 231 for manually moving service device 23 in an out of module 2; and
a first receptacle 230 for containing a first substance and a second receptacle 232 for containing a second substance, such as a lower receptacle 230 and an upper receptacle 232, in particular a lower receptacle for containing liquid and an upper receptacle for containing a solid.

As illustrated in FIG. 3, interface 21',25,26 are mounted in or on handle 231.

For example, service device 23 may be secured in the module's cavity by a snap or a magnetic connector or another assembling means that is stronger than the connection force of the assembled interface 15,16 of auxiliary device 10 and corresponding interface 21',26,27 of module 2. Hence, when the interface of module 1, i.e. part of service device 23, and of auxiliary device 10 are separated, service device 23 stays in place in the cavity of module 2. An example of a suitable arrangement for holding service device 23 in the cavity of module 2 is disclosed in WO 2011/086087.

Service device 23 may be arranged in module 2 for collecting used ingredients, such as tea leaves or ground coffee, e.g. within used capsules, and waste liquid. Service device 23 may include a collector in an upper receptacle 232 for solids and a lower compartment 230 for liquids. Service device 23 is insertable, e.g. slidable, into a seat or cavity formed in module 2 and removable therefrom for servicing, e.g. emptying the solids and/or liquids contained therein. For example, the storage capacity of collector 232 for a used ingredient may be aligned to the storage capacity of a liquid supply reservoir such as a water reservoir, e.g. as taught in WO 2010/128109. A service device safety mechanism that can be adapted to the present device is disclosed in WO 2011/086087 and in WO 2011/086088.

Service device 23 may be positioned in a lower part of beverage preparation module to collect upon beverage preparation a used flavouring ingredient evacuated to device 23, e.g. by gravity, for instance from an ingredient brewing or mixing unit. Examples of suitable brewing unit configurations are for example disclosed in EP 1 646 305, EP 1 859 713, EP 1 859 714 and WO 2009/043630.

Device 23 typically has an anti-clogging arrangement, as for example taught in WO 2009/074559 and in WO 2009/135869, which are hereby incorporated by way of reference.

Beverage preparation module 2 typically includes one or more of the following components:
a) the ingredient holder, such as a brewing unit, for receiving the flavouring ingredient of this beverage, in particular a pre-portioned ingredient supplied within a capsule, and for guiding an incoming flow of liquid, such as water, through this ingredient to beverage outlet 20;
b) a boiler or an in-line heater, such as a thermoblock, for heating this flow of liquid to be supplied to the ingredient holder;
c) a pump for pumping liquid through the in-line heater or from the boiler;
d) one or more fluid connecting members for guiding liquid from a source of liquid, such as tank of liquid, to beverage outlet 20;
e) an electric control unit, in particular comprising a printed circuit board (PCB), for receiving instructions from a user via an interface and for controlling the in-line heater and the pump; and
f) one or more electric sensors for sensing at least one operational characteristic selected from characteristics of the ingredient holder, the boiler or in-line heater, the pump, liquid reservoir, service device 23, a flow of liquid, a pressure of liquid and a temperature of liquid, and for communicating such characteristic(s) to the control unit.

The heater may be a boiler, thermoblock or an on demand heater (ODH), for instance an ODH type disclosed in EP 1 253 844, EP 1 380 243 and EP 1 809 151. Examples of suitable brewing units and capsule management are for example disclosed in WO 2005/004683, WO2007/135136 and WO 2009/043630, which are hereby incorporated by way of reference. Suitable beverage preparation modules are for instance disclosed in WO 2009/074550 and WO 2009/130099, which are hereby incorporated by way of reference.

Module 2 typically has a bottom 22. The auxiliary device bottom 12 and module bottom 22 can be both arranged to rest on a same external support surface 5 and to be supported thereby during use. Bottoms 12,22 are in particular adjacent to each other during use.

A mentioned above, module 2 and auxiliary device 10 can be magnetically constrainable together by the interface 21',25,26 and the device interface 15,16. Device interface 15,16 may have a magnetic field-generating element 16 and module interface 25,26 can have a ferromagnetic element 26,26',26" and/or vice versa. Element 16 of auxiliary device 10 may have an average magnetic field axis 16a that is off-set above an average magnetic field axis 26a of the module 2 so that auxiliary device 10 is urged downwards by module 2, e.g. onto support surface 5 so that the positioning of auxiliary device 10 is safe on surface 5.

In a particular embodiment, auxiliary device 10 is a cup-support device that comprises a device support member 11, such as a generally upright wall 11 as discussed above, and module 2 comprises a module support member 21,23, such as a wall of a module housing 21 or of a service device 23 as discussed above. Device support member 11 supports one or more (e.g. two) device elements 16 and module support member 21,23 supports one or more module elements 26,26',26". Device element(s) 16 and module element(s) 26,26',26" form the module and device interfaces and are magnetically constrainable together. When a device element 16 and a module element 26,26',26" are magnetically constrained together:

device element 16, in particular an apparent face 16b thereof, is recessed in an recess 15 of the device support member 11 and module element 26,26',26", in particular an apparent face 26b thereof, protrudes away from module support member 21,23 so that the module element, in particular apparent module face 26b, extends into device recess 15, in particular to or towards apparent device face 16b; or the device element, in particular an apparent face thereof, protrudes away from the device support member and the module element, in particular an apparent face thereof, is recessed in a recess of the module support member so that the device element, in particular the apparent device face, extends into the module recess, in particular to or towards the apparent module face.

Figure 4:
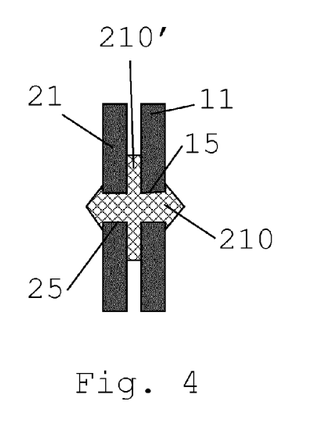
FIG. 4 illustrates a variation of an assembly of the module and auxiliary device in accordance with the invention.

FIG. 4 schematically shows a variation in which module interface 15 and auxiliary device interface 210,25 are mechanically fixed together upon assembly together. Fixing of the interfaces is achieved by means of dampening member 210. Dampening member 210 has an intermediate spacing portion 210', e.g. in the shape of a disc, that separates wall 21 of the beverage preparation module from wall 11 of the auxiliary device and prevent that walls 11,21 contact each other. Openings 15 and 25 in walls 11 and 21 receive extremities of member 210 that are arrow-shaped to prevent subsequent disassembly.

Figure 5:
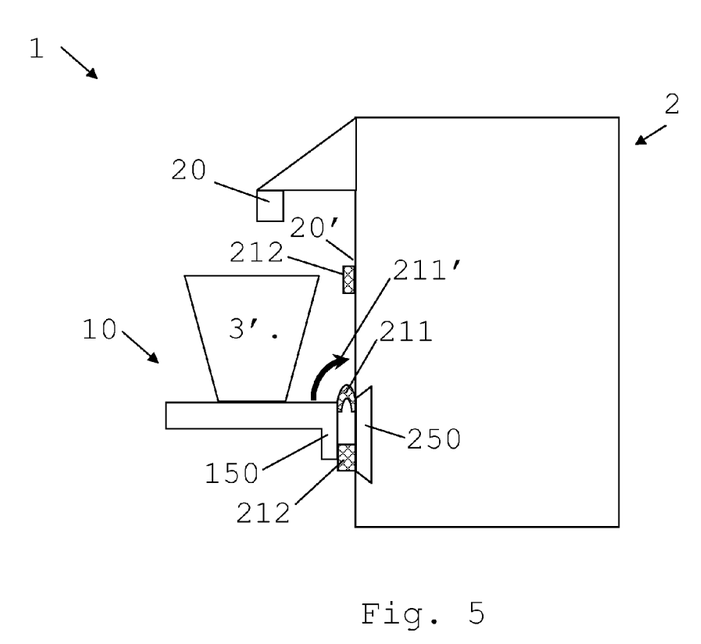
FIG. 5 illustrates a variation of a module and an auxiliary device, in which the auxiliary device is secured on a foot of the module.

FIG. 5 schematically shows a further beverage preparation machine 1. Module 2 and device 10, e.g. a cup-support, are mechanically fixed together upon assembly by device interface 150 and module interface 211,212,250. In this example, one of these interfaces 250, in particular the module interface, is removable. For instance, module interface 250 is slidable in an out of module 2. Alternatively, such interface 250 is fixed in module 2, e.g. by force-fitting, welding, gluing, screws, etc. . . .

Module and device interfaces 150,211,212,250 include a pair of dampening members 211,212. Dampening member 211 is fixed to both interfaces and forms a flexure bearing for allowing motion such as rotation, as indicated by arrow 211', of auxiliary device 10 relative to the module 2. Auxiliary device 10 may be a cup support and be movable, e.g. in a horizontal deployed position (FIG. 5) and in a retracted upright position, as disclosed in EP 1 867 260 A1. Dampening members 212 may be fixed either on module 2 or on device 10. Members 212 are used to space device from module 2 and to maintain device 10 horizontally in the deployed position. Alternatively, dampening members 211 and 212 could be formed of a single component. Device 10 may be maintained in the horizontal and upright positions magnetically and/or by gravity. Moreover, in the upright position, device 10 may be maintained by the presence of a large cup placed on an external support surface (e.g. a table) under outlet 20.

Figure 6:
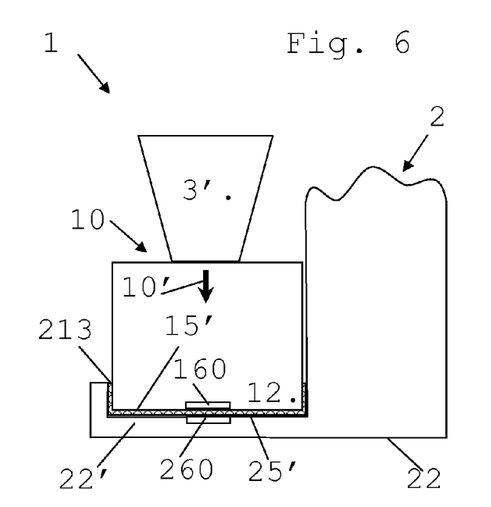
FIG. 6 shows a further variation of the invention in which the auxiliary device is assembled to the beverage preparation module in a movable manner, in accordance with the invention.

FIG. 6 schematically shows yet another variation in accordance with the invention, in which auxiliary device 10 has a bottom 12 arranged to rest on a foot 22' of module 2. For example, foot 22' forms a nest for receiving bottom 12. Device bottom 12 forms a device interface 15' spaced by at least one dampening member 213 over a module interface 25' formed by foot 22'. Auxiliary device 10 and module 2 can be assembled and secured together by being constrained together magnetically by corresponding elements 160,260 and by gravity, as indicated by arrow 10'. For example, dampening member 213 is fixed to bottom 12 and movable therewith. Dampening member 213 may form an envelope or may be a stripe or made up of one or more elements.

For instance, auxiliary device 10 forms a cup support device for placing a small cup 3' under a beverage outlet of machine 1. To place a large cup under the outlet, the cup support device 10 may be removed and the large cup placed on foot 22'.

The invention claimed is:

1. A beverage preparation machine comprising:
   a beverage preparation module comprising at least one module interface, the at least one module interface comprising a first module interface;
   an auxiliary device comprising at least one device interface, the at least one device interface comprising a first device interface; and
   the first module interface and the first device interface being arranged for assembling the beverage preparation module and the auxiliary device together, at least one of the first module interface and the first device interface comprises one or more dampening members so arranged that the beverage preparation module and the auxiliary device are in direct contact only via the one or more dampening members when the beverage preparation module and the auxiliary device are assembled together via the first module interface and the first device interface,
   the auxiliary device forms a cup support for supporting a cup under a beverage outlet of the beverage preparation module:
   the cup support having a bottom for resting on an external support surface or on a foot of the beverage preparation module; and/or
   the cup support having a platform that is supported by the bottom of the cup support and that is configured for receiving the cup and supporting the cup above the bottom of the cup support, the platform spaced over the bottom of the cup support by an upright wall forming, with the bottom of the cup support, a receptacle having a cavity for collecting liquid; and/or the beverage preparation module having a service device bearing a second module interface.

2. The machine of claim 1, wherein the one or more dampening members are made of a material having a rubber-type or an elastomeric elasticity and/or an ability for plastic deformation.

3. The machine of claim 1, wherein the first module interface and the first device interface are mechanically fixed together upon assembly.

4. The machine of claim 1, wherein upon assembly the first module interface and the first device interface are disassemblable.

5. The machine of claim 4, wherein the first device interface is an operative module interface, and the auxiliary device is assemblable to the beverage preparation module by the operative module interface in an operative position.

6. The machine of claim 5, wherein the at least one device interface further comprises a rest module interface, and the auxiliary device is assemblable to the beverage preparation module by the rest module interface in a rest position, the rest position being different to the operative position of the auxiliary device.

7. The machine of claim 1, wherein at least one of the one or more dampening members forms a flexure bearing allowing motion of the auxiliary device relative to the beverage preparation module.

8. The machine of claim 1, wherein the auxiliary device has a bottom arranged to rest on a foot of the beverage preparation module, the bottom forming the first device interface spaced by at least one of the one or more dampening members over a first module interface formed by the foot, the auxiliary device and the beverage preparation module constrained together magnetically and/or by gravity.

9. The machine of claim 1, wherein the beverage preparation module and the auxiliary device are arranged to rest directly on a common external support surface and to be supported thereby during use.

10. The machine of claim 9, wherein the auxiliary device comprises an upright wall in or on which the first device interface is mounted and the beverage preparation module comprises a first face in or on which the first module interface is located, the upright wall and the first face facing each other when the beverage preparation module and auxiliary device are assembled together via the first module interface and the first device interface.

11. The machine of claim 10, wherein the beverage preparation module further comprises a second module interface spaced apart from the first module interface.

12. A beverage preparation machine comprising:
a beverage preparation module comprising at least one module interface, the at least one module interface comprising a first module interface;
an auxiliary device comprising at least one device interface, the at least one device interface comprising a first device interface; and
the first module interface and the first device interface being arranged for assembling the beverage preparation module and the auxiliary device together, at least one of the first module interface and the first device interface comprises one or more dampening members so arranged that the beverage preparation module and the auxiliary device are in direct contact only via the one or more dampening members when the beverage preparation module and the auxiliary device are assembled together via the first module interface and the first device interface, wherein the first device interface and the first module interface are magnetically constrained together when the auxiliary device is assembled to the beverage preparation module.

13. The machine of claim 12, wherein the first device interface comprises at least one magnetic field-generating element arranged to be magnetically constrained against corresponding ferromagnetic element of the first module interface.

14. The machine of claim 13, wherein at least one of the one or more dampening members is arranged about a magnetic field generating element and/or a ferromagnetic element.

15. A beverage preparation machine of comprising:
a beverage preparation module comprising at least one module interface, the at least one module interface comprising a first module interface;
an auxiliary device comprising at least one device interface, the at least one device interface comprising a first device interface; and
the first module interface and the first device interface being arranged for assembling the beverage preparation module and the auxiliary device together, at least one of the first module interface and the first device interface comprises one or more dampening members so arranged that the beverage preparation module and the auxiliary device are in direct contact only via the one or more dampening members when the beverage preparation module and the auxiliary device are assembled together via the first module interface and the first device interface,
wherein the auxiliary device forms a cup support for supporting a cup under a beverage outlet of the beverage preparation module, the auxiliary device is a heightening device for increasing the height of a short cup under the beverage outlet upon assembly to the beverage preparation module, and wherein the beverage preparation module is arranged to dispense a beverage from the beverage outlet into a tall cup placed under the beverage outlet upon removal of the heightening device from under the beverage outlet of the beverage preparation module.

16. A beverage preparation machine comprising:
a beverage preparation module comprising at least one module interface, the at least one module interface comprising a first module interface;
an auxiliary device comprising at least one device interface, the at least one device interface comprising a first device interface; and
the first module interface and the first device interface being arranged for assembling the beverage preparation module and the auxiliary device together, at least one of the first module interface and the first device interface comprises one or more dampening members so arranged that the beverage preparation module and the auxiliary device are in direct contact only via the one or more dampening members when the beverage preparation module and the auxiliary device are assembled together via the first module interface and the first device interface, wherein the beverage preparation module and the auxiliary device are arranged to rest directly on a common external support surface and to be supported thereby during use, and wherein the auxiliary device comprises an upright wall in or on which the first device interface is mounted and the beverage preparation module comprises a first face in or on which the first module interface is located, the upright wall and the first face facing each other when the beverage preparation module and auxiliary device are assembled together via the first module interface and the first device interface, the first device interface comprising a magnetic or ferromagnetic element and the first module interface comprising a corresponding magnetic or ferromagnetic element so that when the magnetic or ferromagnetic element of the first device interface and the magnetic or ferromagnetic element of the first module interface are magnetically constrained together:

the magnetic or ferromagnetic element of the first device interface is recessed in a first recess of the upright wall and the magnetic or ferromagnetic element of the first module interface protrudes away from the first face such that the magnetic or ferromagnetic element of the first module interface extends into the first recess; or the magnetic or ferromagnetic element of the first device interface protrudes away from the upright wall and the magnetic or ferromagnetic element of the first module interface is recessed in a second recess of the first face such that the magnetic or ferromagnetic element of the first device interface extends into the second recess to or towards the first face.

17. A beverage preparation machine comprising:

a beverage preparation module comprising at least one module interface, the at least one module interface comprising a first module interface;

an auxiliary device comprising at least one device interface, the at least one device interface comprising a first device interface; and the first module interface and the first device interface being arranged for assembling the beverage preparation module and the auxiliary device together, at least one of the first module interface and the first device interface comprises one or more dampening members so arranged that the beverage preparation module and the auxiliary device are in direct contact only via the one or more dampening members when the beverage preparation module and the auxiliary device are assembled together via the first module interface and the first device interface, wherein the beverage preparation module and the auxiliary device are arranged to rest directly on a common external support surface and to be supported thereby during use, wherein the auxiliary device comprises an upright wall in or on which the first device interface is mounted and the beverage preparation module comprises a first face in or on which the first module interface is located, the upright wall and the first face facing each other when the beverage preparation module and auxiliary device are assembled together via the first module interface and the first device interface, and wherein the beverage preparation module further comprises a second module interface spaced apart from the first module interface, the second module interface located in or on a second face different from the first face, the upright wall and the second face facing each other when the beverage preparation module and the auxiliary device are assembled together via the first device interface and the second module interface.

* * * * *